United States Patent
Yang et al.

(10) Patent No.: US 9,306,641 B1
(45) Date of Patent: Apr. 5, 2016

(54) MULTIPLE INPUT MULTIPLE OUTPUT WIRELESS COMMUNICATION SYSTEM AND CHANNEL DECOMPOSITION METHOD THEREOF

(71) Applicant: Winbond Electronics Corp., Taichung (TW)

(72) Inventors: Chia-Hsiang Yang, Kinmen County (TW); Yu-Cheng Tsai, Tainan (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 14/735,164

(22) Filed: Jun. 10, 2015

(30) Foreign Application Priority Data

Jan. 12, 2015 (TW) .............................. 104100955 A

(51) Int. Cl.
*H04B 7/04* (2006.01)
*H04L 25/02* (2006.01)
*H04B 7/06* (2006.01)
*H04L 5/00* (2006.01)

(52) U.S. Cl.
CPC ............ *H04B 7/0413* (2013.01); *H04B 7/0626* (2013.01); *H04L 5/0053* (2013.01); *H04L 25/0202* (2013.01)

(58) Field of Classification Search
USPC .................... 375/267, 260, 257, 341; 370/328
See application file for complete search history.

(56) References Cited

U.S. PATENT DOCUMENTS

| 8,199,841 B1 | 6/2012 | Sarrigeorgidis et al. | |
| 8,213,540 B1 | 7/2012 | Lee et al. | |
| 8,681,883 B2 * | 3/2014 | Yonge, III | H04B 3/542 375/257 |
| 8,737,540 B1 | 5/2014 | Shi et al. | |
| 8,982,980 B2 * | 3/2015 | Zhang | H04B 7/0634 375/219 |
| 2008/0037669 A1 * | 2/2008 | Pan | H04B 7/0417 375/260 |
| 2011/0188615 A1 * | 8/2011 | Yang | H04L 27/06 375/341 |
| 2011/0274188 A1 * | 11/2011 | Sayana | H04B 7/0639 375/260 |
| 2012/0257574 A1 * | 10/2012 | Seok | H04W 72/046 370/328 |

OTHER PUBLICATIONS

Meher et al., "50 Years of CORDIC: Algorithms, Architectures, and Applications", IEEE Trans. Circuits and Syst., Sep. 2009, pp. 1893-1907.
Hwang et al., "A Low Complexity Geometric Mean Decomposition Computing Scheme and Its High Throughput VLSI Implement," IEEE Trans. Circuits Syst. Regul. Pap., Apr. 2014, pp. 1170-1182.

* cited by examiner

*Primary Examiner* — Eva Puente
(74) *Attorney, Agent, or Firm* — Jianq Chyun IP Office

(57) ABSTRACT

A multiple input multiple output wireless communication system and a channel decomposition method thereof are provided. The wireless communication system includes a precoding unit, a channel estimation unit, a channel decomposition unit and a quantization unit. The precoding unit receives a plurality of transmission data streams and a quantized wireless channel information to provide a plurality of transmission symbols to a wireless channel. The channel estimation unit estimates the wireless channel to provide a channel matrix. The channel decomposition unit makes a plurality of elements in a diagonal the same real numbered elements through matrix rations and matrix decompositions, and correspondingly rotates a first unit matrix and a second unit matrix to obtain a channel state information. The quantization unit provides the wireless channel information according to the channel state information.

12 Claims, 12 Drawing Sheets

MULTIPLE INPUT MULTIPLE OUTPUT WIRELESS COMMUNICATION SYSTEM AND CHANNEL DECOMPOSITION METHOD THEREOF

CROSS-REFERENCE TO RELATED APPLICATION

This application claims the priority benefit of Taiwan application serial no. 104100955, filed on Jan. 12, 2015. The entirety of the above-mentioned patent application is hereby incorporated by reference herein and made a part of this specification.

BACKGROUND OF THE INVENTION

1. Field of the Invention

The invention relates to a wireless communication system, and particularly relates to a multiple input multiple output wireless communication system and a channel decomposition method thereof.

2. Description of Related Art

Configurations of wireless communication systems may be categorized into single input single output (SISO) systems or multiple input multiple output (MIMO) systems. The MIMO systems may use spatial multiplexing (SM), making the MIMO systems able to transmit different signals with different antenna sets. In other words, the MIMO system is able to offer a higher throughput.

However, when signals are transmitted by using spatial multiplexing, the signals transmitted at the same time are attenuated in a wireless channel and interfered, thus influencing a data transmission rate. Accordingly, a technology of precoding based on channel state information (CSI) is developed. However, decomposing the channel state information from a channel matrix of the wireless channel is a complex operation. Thus, the hardware design of a computer is of a higher complexity. Accordingly, how to reduce the decomposition of the channel matrix become a crucial issue in developing the MIMO system.

SUMMARY OF THE INVENTION

The invention provides a multiple input multiple output wireless communication system and a channel decomposition thereof capable of reducing an operational complexity of decomposing a channel matrix and equalizing a power of an antenna.

A wireless communication system of the invention includes a precoding unit, a channel estimation unit, a channel decomposition unit, and a quantization unit. The precoding unit receives a plurality of transmission data streams and a quantized wireless channel information to provide a plurality of transmission symbols to a wireless channel. The channel estimation unit estimates the wireless channel to provide a channel matrix having a plurality of complex numbered elements. The channel decomposition unit decomposes the channel matrix and then provides a channel state information. The channel decomposition unit performs a first matrix rotation to the channel matrix to convert the complex numbered elements in a diagonal into a plurality of real numbered elements, and determines whether the real numbered elements are divided into a plurality of computation parts based on the number of the real numbered elements in the diagonal. When the real numbered elements are not divided into the computation parts, the channel decomposition unit equalizes the real numbered elements by using a singular value decomposition, a matrix decomposition, and an element permutation. When the real numbered elements are divided into the computation parts, one of the computation parts equalizes the real numbered elements by using the singular value decomposition, the matrix decomposition and the element permutation, and remaining parts rotate the real numbered elements to be equal to a diagonal geometric mean by using the the singular value decomposition and a second matrix rotation. The channel decomposition unit sequentially rotates a first unit matrix by column and sequentially rotates a second unit matrix by row based on a plurality of rotation angles of the first matrix rotation, the second matrix rotation, the singular value decomposition, the matrix decomposition, and the element permutation performed with the complex numbered elements to obtain the channel state information. The quantization unit provides the wireless channel information based on the channel state information.

A channel decomposition method of a multiple input multiple output wireless communication system of the invention includes the following steps. A wireless channel is estimated by using a channel estimation unit to provide a channel matrix. The channel matrix is decomposed by using a channel decomposition unit and then a channel state information is provided. The step further includes: performing a first matrix rotation to the channel matrix by using the channel decomposition unit, such that the complex numbered elements in a diagonal are converted into a plurality of real numbered elements; determining whether to divide the real numbered elements into a plurality of computation parts based on the number of the real numbered elements in the diagonal; when the real numbered elements are not divided into the computation parts, the channel decomposition unit equalizing the real numbered elements by using a singular value decomposition, a matrix decomposition, and an element permutation; when the real numbered elements are divided into the computation parts, one of the computation parts equalizing the real numbered elements by using the singular value decomposition, the matrix decomposition and the element permutation, and remaining of the computation parts rotating the real numbered elements to become equal to a diagonal geometric mean by using the the singular value decomposition and a second matrix rotation; sequentially rotating a first unit matrix by column and sequentially rotating a second unit matrix by row based on a plurality of rotation angles of the first matrix rotation, the second matrix rotation, the singular value decomposition, the matrix decomposition, and the element permutation performed with the complex numbered elements by using the channel decomposition unit, so as to obtain the channel state information. A wireless channel information is provided based on the channel state information by using a quantization unit. In addition, a plurality of transmission symbols are provided to the wireless channel based on a plurality of transmission data streams and the wireless channel information by using a precoding unit.

Based on the above, in the multiple input multiple output wireless communication system and the channel decomposition method thereof according to the embodiments of the invention, the channel matrix is divided into three matrices that multiply each other by using the matrix rotation and the matrix decomposition, and the elements in the diagonal of the middle matrix are equalized. In this way, the memory space and the computation complexity required for decomposing the channel matrix may be reduced, and a power of an antenna may be equalized.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
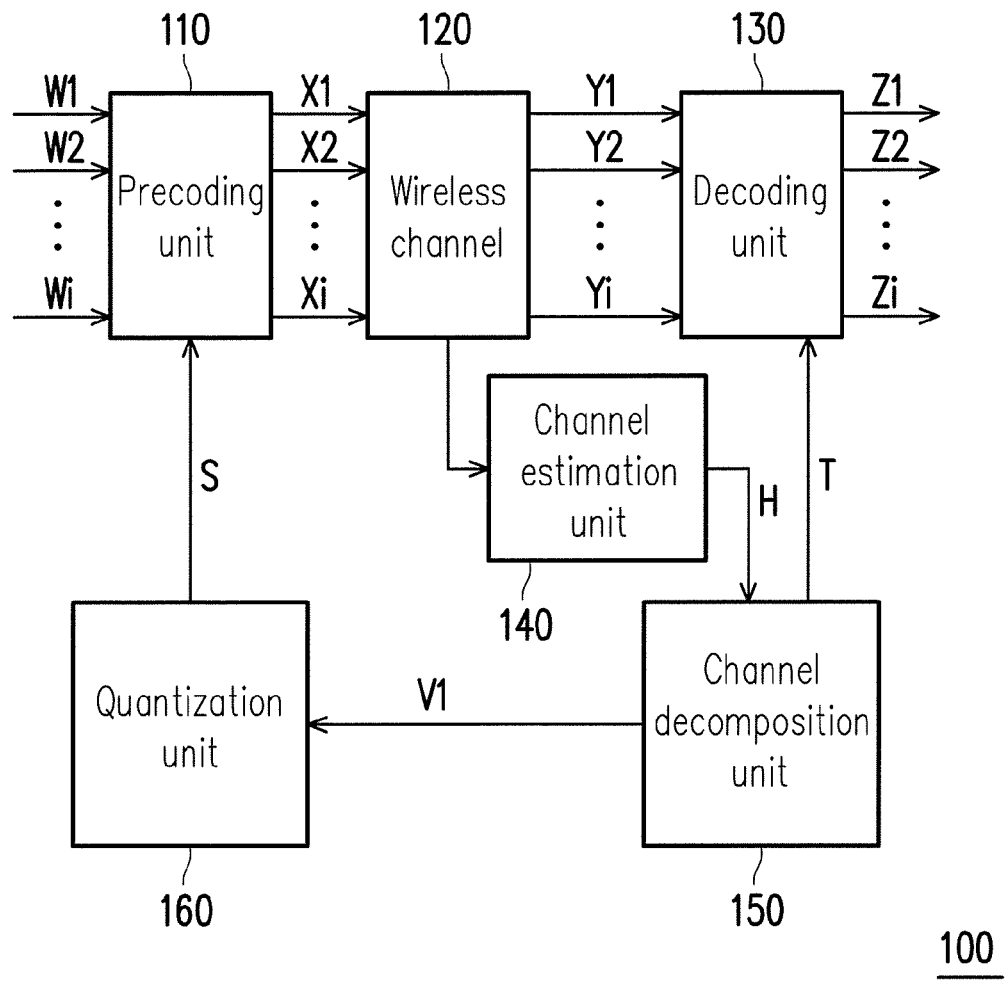
FIG. 1 is a schematic system view illustrating a multiple input multiple output wireless communication system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic system view illustrating a multiple input multiple output wireless communication system according to an embodiment of the invention. Referring to FIG. 1, in this embodiment, a wireless communication system 100 includes a precoding unit 110, a decoding unit 130, a wireless channel 120, a channel estimation unit 140, a channel decomposition unit 150, and a quantization unit 160. The precoding unit 110 receives a plurality of transmission data streams (e.g., W1 to Wi, wherein i is a positive integer) and a quantized wireless channel information matrix S, so as to provide a plurality of transmission symbols (e.g., X1 to Xi) to the wireless channel 120. In addition, the transmission symbol X (i.e., a set of the transmission symbols X1 to Xi) may be defined as X=S·W. W is a set of the transmission data streams W1 to Wi, for example.

After passing through the wireless channel 120, the transmission symbols X1 to Xi may be attenuated due to noise interference and a corresponding transmission distance. Accordingly, receiving symbols Y1 to Yi are formed. In addition, a receiving symbol Y (i.e., a set of the receiving symbols Y1 to Yi) may be defined as Y=HX+n, wherein H is a channel matrix, and n is a white Gaussian noise (AWGN). After receiving the receiving symbols Y1 to Yi, the decoding unit 130 may decode the receiving symbols Y1 to Yi based on a decoding reference matrix T to output receiving data streams Z1 to Zi. In addition, a receiving data stream vector Z (i.e., a set of the receiving data streams Zi to Z1) may be defined as Z=T·Y, and Y is the set of the receiving symbols Y1 to Yi, for example.

The channel estimation unit 140 estimates the wireless channel 120 to provide a channel matrix H having a plurality of complex numbered elements. The channel decoding unit 150 decodes the channel matrix H and then provides a channel state information V1 and the decoding reference matrix T. The quantization unit 160 provides a wireless channel information matrix S based on the channel state information V1.

In this embodiment, the channel decomposition unit 150 uses at least one of a first matrix rotation, a second matrix rotation, and a matrix decomposition to divide the channel matrix H into three matrices Q, R, P that multiply each other.

In addition, the matrices Q and P are complex unitary matrices, and the matrix R is an upper triangular real matrix with the same value in the diagonal. Besides, matrix sizes of the matrices Q, R, and P are the same. The first matrix rotation is a Givens rotation, for example, the second matrix rotation is a planar rotation, for example, and the matrix decomposition is a geometric mean decomposition (GMD), for example. In addition, the matrix rotations may be performed with a coordinate rotation digital computer (CORDIC). The coordinate rotation digital computer may include an adder, a substractor, and a shifter, and a rotation angle may be calculated by using the coordinate rotation digital computer, for example.

Figure 2A:
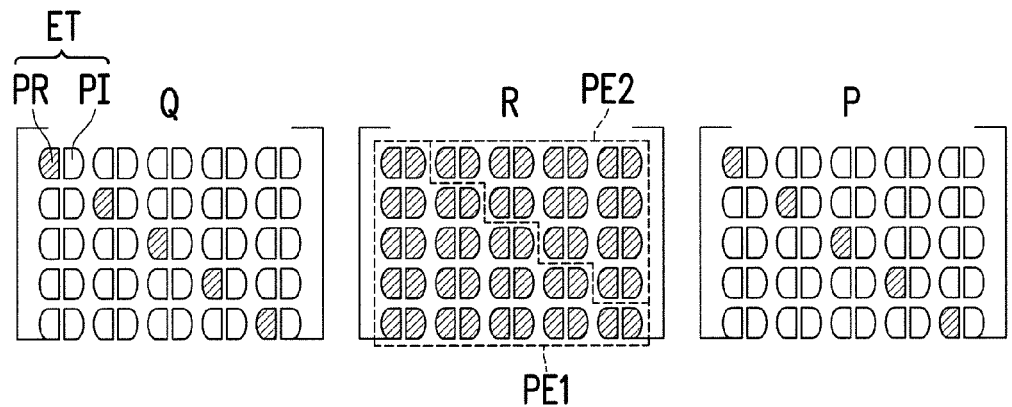
FIGS. 2A to 2Q are schematic views illustrating channel matrix decomposition according to an embodiment of the invention.
Figure 2B:
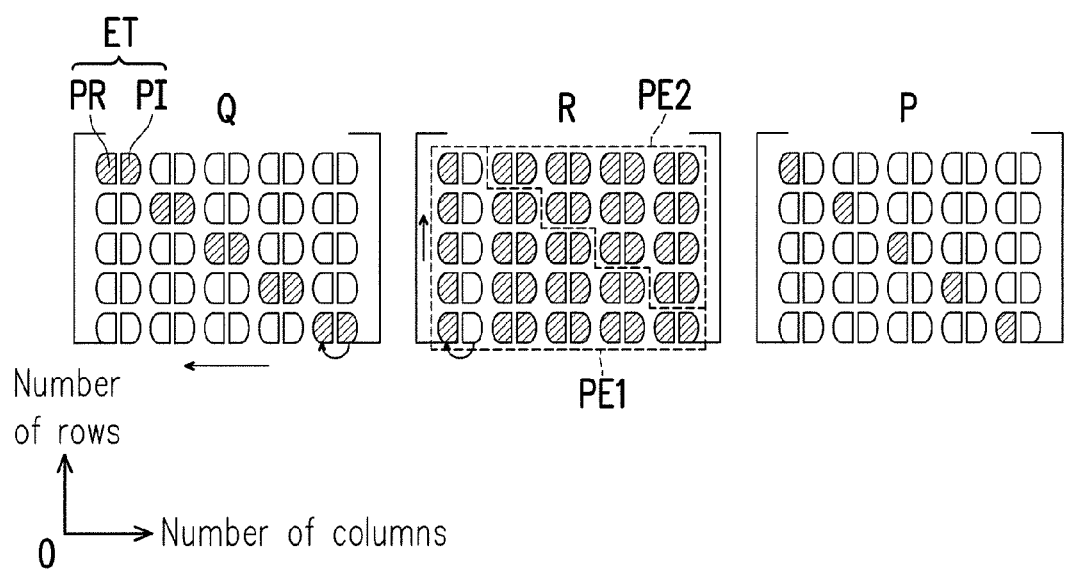
Figure 2C:
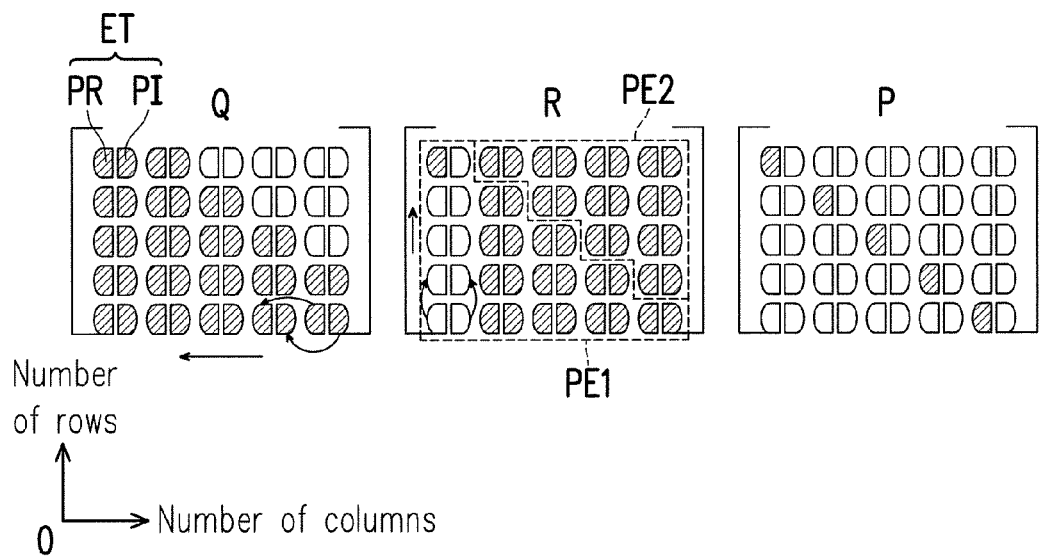
Figure 2D:
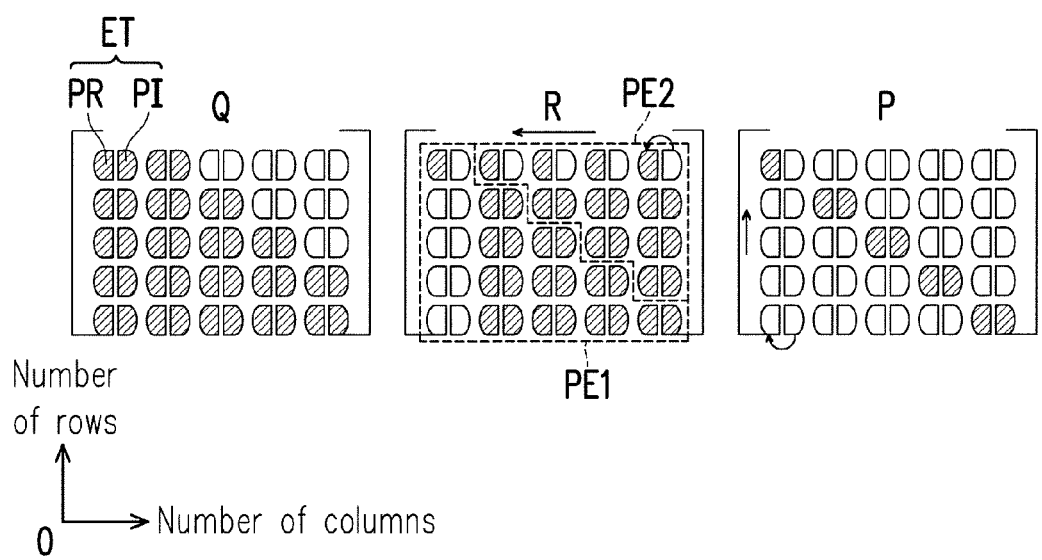
Figure 2E:
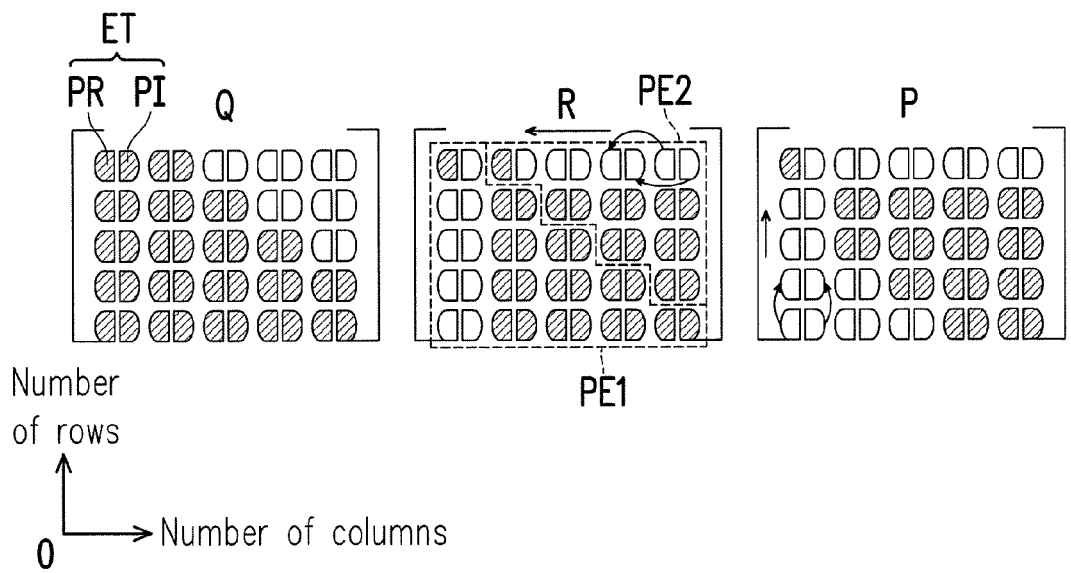
Figure 2F:
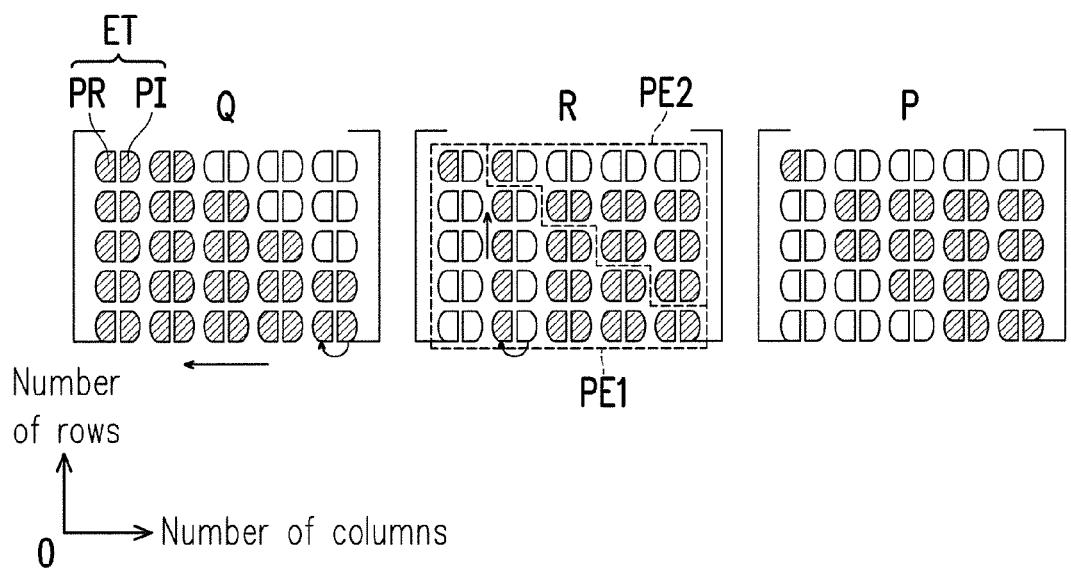
Figure 2G:
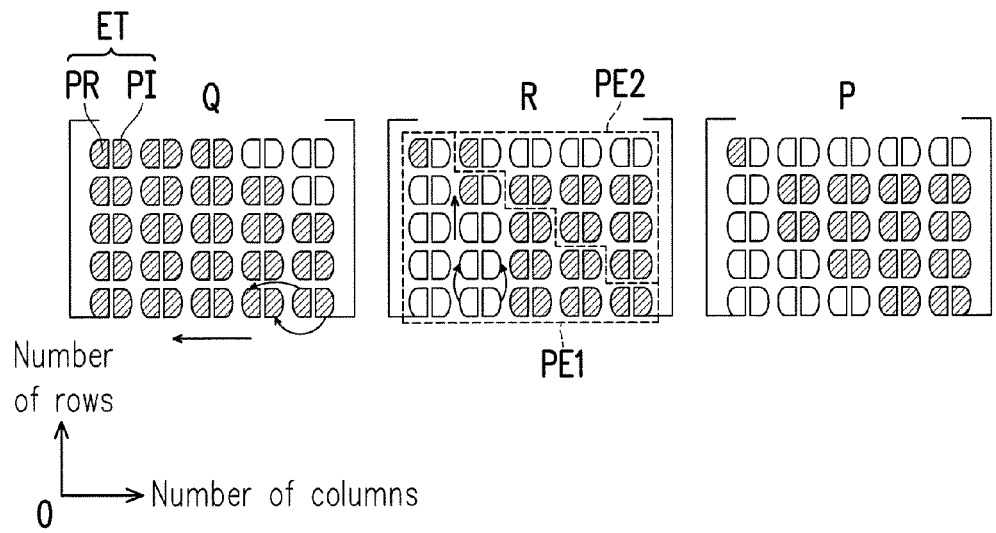
Figure 2H:
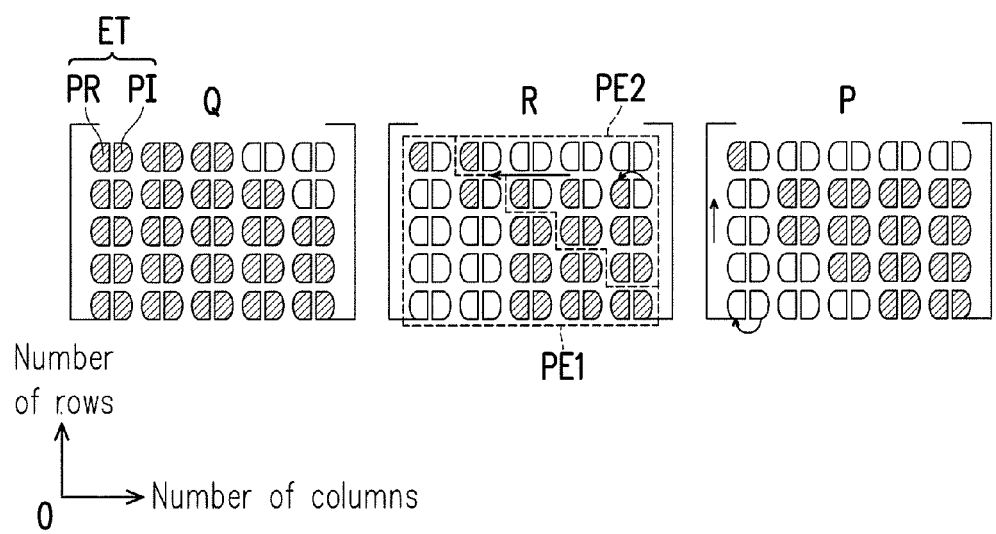
Figure 2I:
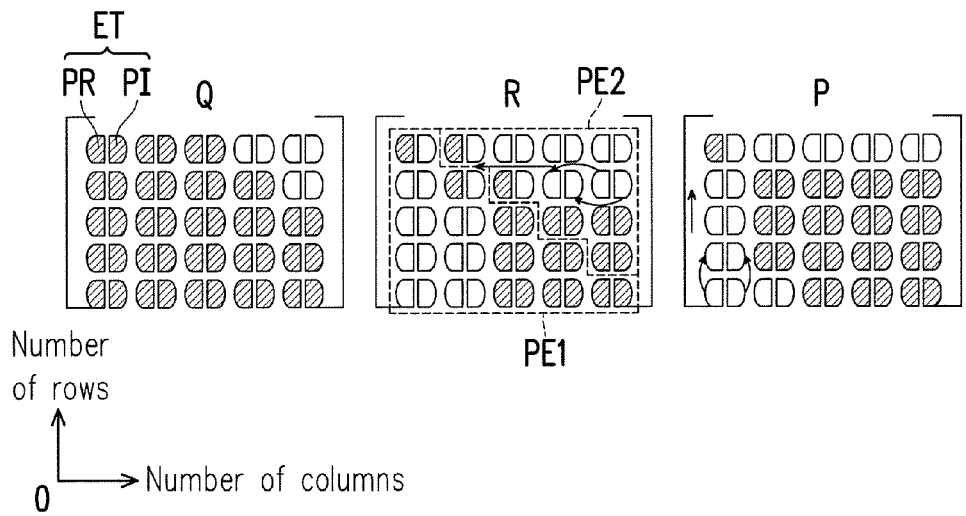
Figure 2J:
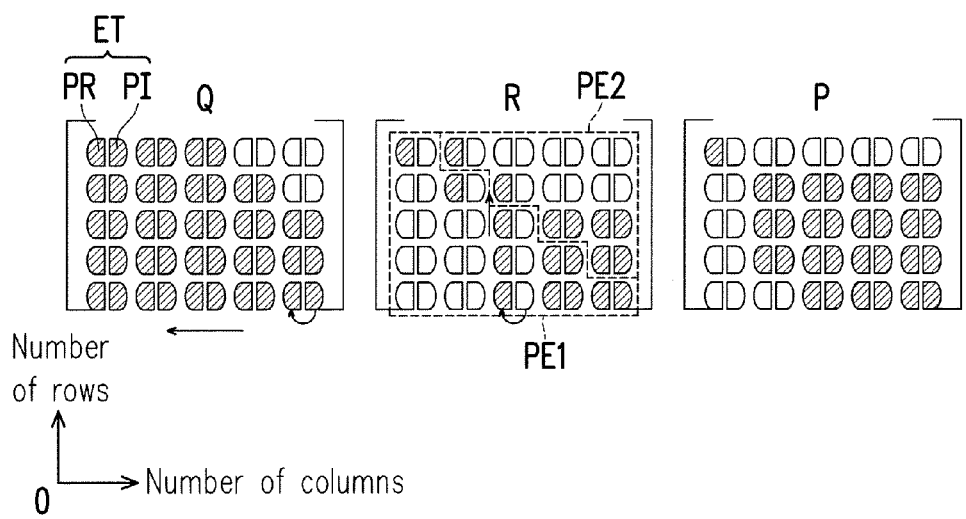
Figure 2K:
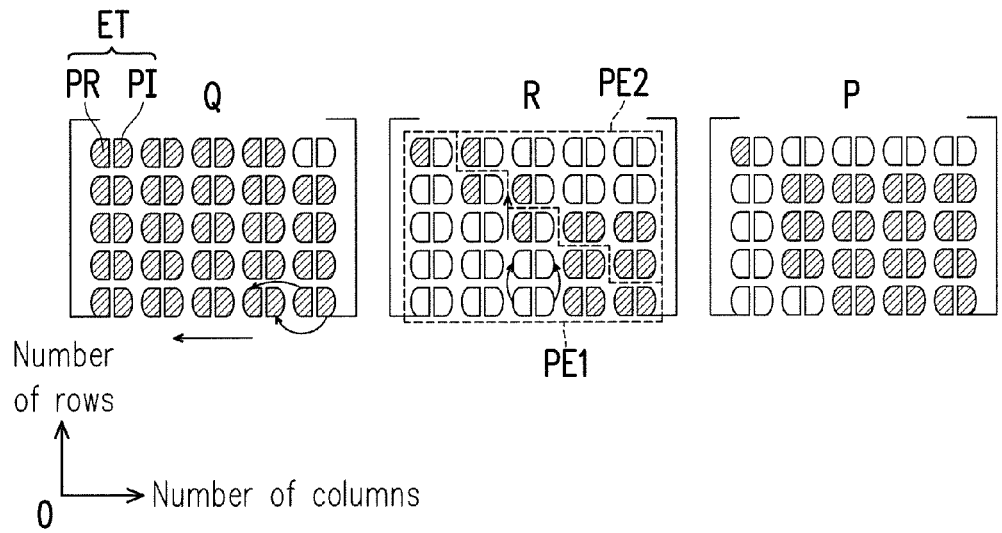
Figure 2L:
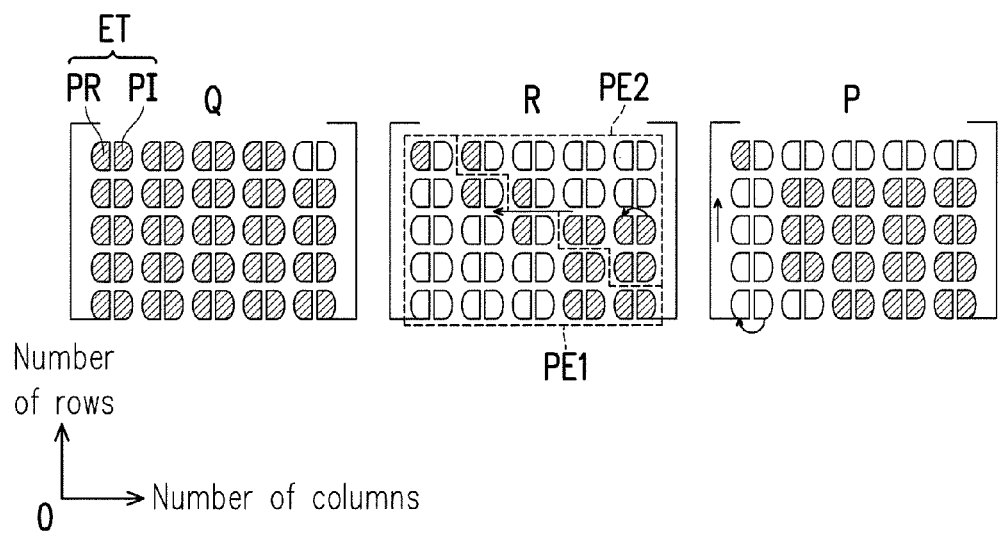
Figure 2M:
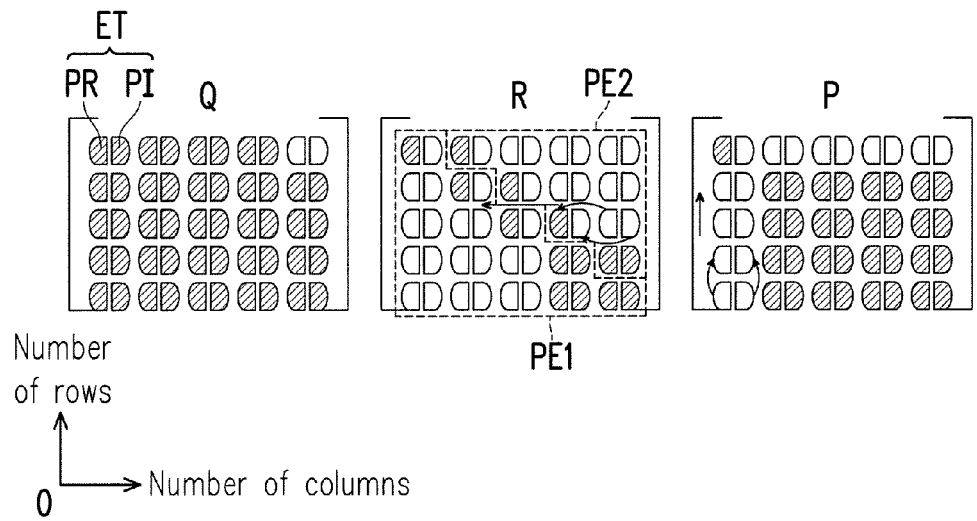
Figure 2N:
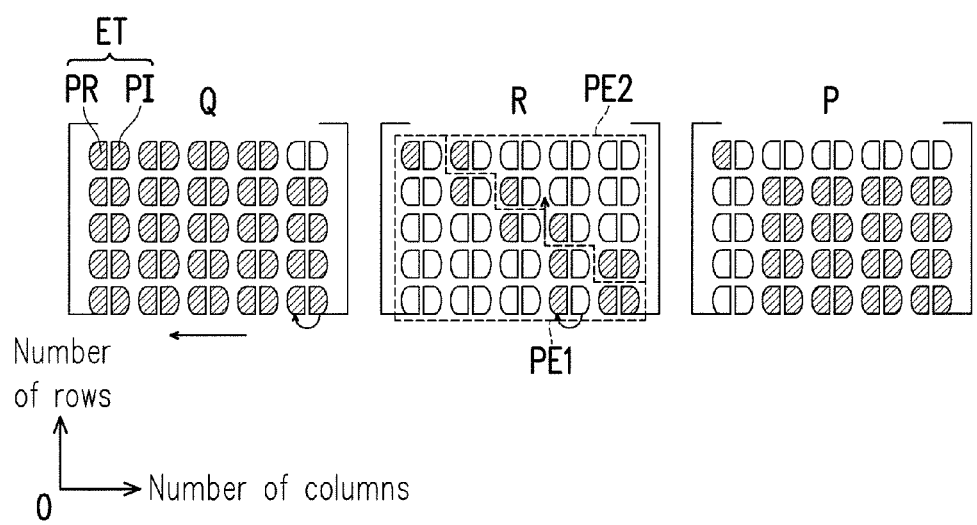
Figure 2O:
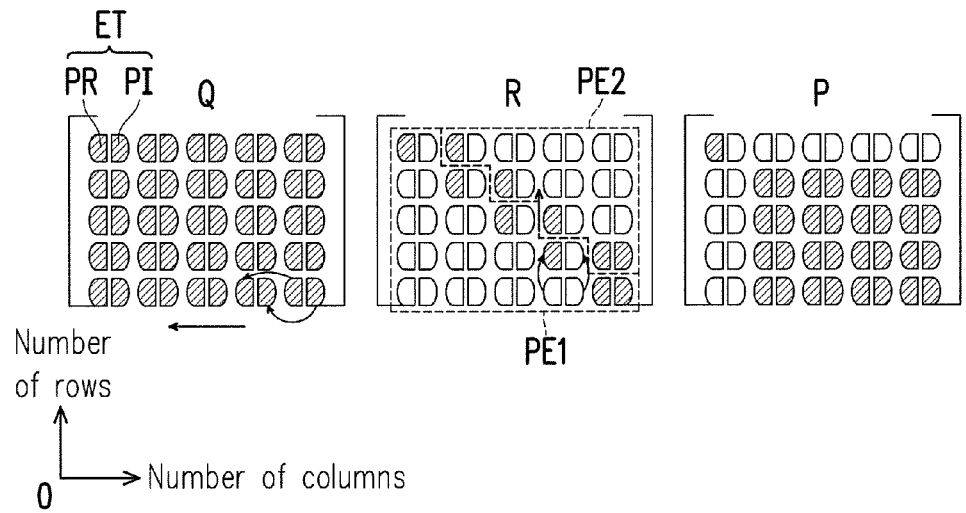
Figure 2P:
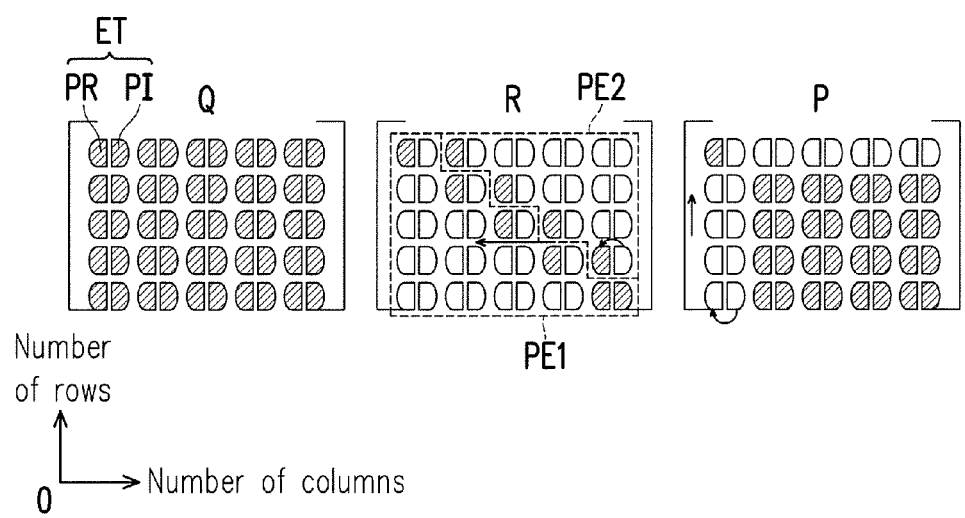
Figure 2Q:
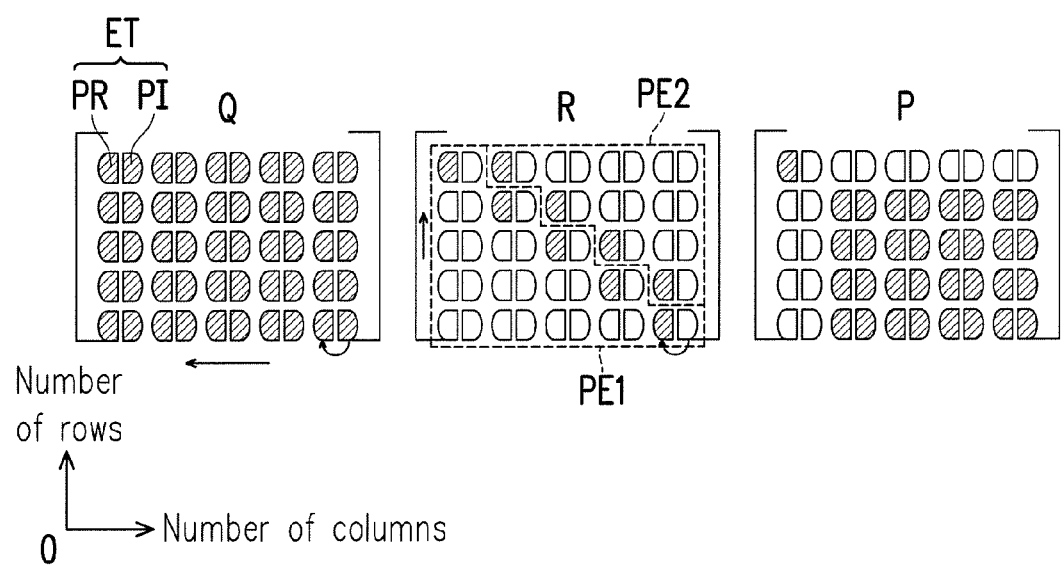

FIGS. 2A to 2Q are schematic views illustrating channel matrix decomposition according to an embodiment of the invention. Referring to FIG. 1 and FIGS. 2A to 2Q, in this embodiment, the matrices Q, R, P are 5×5 matrices, for example. However, other embodiments of the invention are not limited thereto. The matrices Q and P are initialized as unit matrices, and the matrix R is initialized as the matrix H. Here, a horizontal axis indicates the column number and a vertical axis indicates the row number. In FIG. 2A, each element ET includes a real numbered part PR and an imaginary numbered part PI. Namely, the element ET is a complex numbered element, and the matrix R may divide the elements ET into a first block PE1 including a diagonal and a second block PE2 not including the diagonal.

In FIG. 2B, the elements ET in the first column of the matrix R are converted into real numbered elements (i.e., a value of the imaginary numbered part PI in the element ET becomes 0) by using a matrix rotation. More specifically, first of all, the element ET at the first column and the first row in the matrix R is represented as element R(1,1). The value of the imaginary numbered part PI thereof is transposed to the real numbered part PR thereof through the matrix rotation. A rotation angle dR(1,1) thereof may be obtained by using the coordinate rotation digital computer. Namely, the rotation angle dR(1,1) is obtained by inputting a value of the real numbered part PR and the value of the imaginary numbered part PI into the coordinate rotation digital computer. At this time, regardless of the first block PE1 or the second block PE2, all the elements ET in the first row of the matrix R may rotate from the imaginary numbered parts PI thereof toward the real numbered parts PR thereof according to the rotation angle dR(1,1). To keep a consistency of the matrix, all the elements ET in the fifth column of the matrix Q may rotate from the imaginary numbered parts PI thereof toward the real numbered parts PR thereof according to the rotation angle dR(1,1).

Then, an element R(1,2) at the first column and the second row of the matrix R may transpose a value of the imaginary numbered part PI thereof to the real numbered part thereof through the matrix rotation, and a rotation angle thereof is dR(1,2). At this time, regardless of the first block PE1 or the second block PE2, all the elements ET in the second row of the matrix R may rotate from the imaginary numbered parts PI thereof toward the real numbered parts PR thereof according to the rotation angle dR(1,2). To keep the consistency of the matrix, all the elements ET in the fourth column of the matrix Q may rotate from the imaginary numbered parts PI thereof toward the real numbered parts PR thereof according to the rotation angle dR(1,2).

Other elements ET in the first column of the matrix R may be processed based on the foregoing, and the elements ET in the matrices R and Q are rotated from the imaginary numbered parts PI thereof toward the real numbered parts PR thereof according to the corresponding rotation angles. Moreover, a processing direction of the elements ET in the matrix R is from bottom to top (according to the direction of the figure, for example), and a processing direction of the elements ET in the matrix Q is from right to left (according to the direction of the figure, for example). Also, a rotation angle of the elements ET in the matrix R is positive (i.e., positive angle rotation), and a rotation angle of the elements ET in the matrix Q is negative (i.e., negative angle rotation). For the element ET whose value in the real numbered part PR is 0 and whose value in the imaginary numbered part is 0, the value thereof does not change after the matrix rotation.

In FIG. 2C, all the elements ET except for an element R(1,5) in the first column of the matrix R are made ineffective (i.e., the value of the real numbered part PR and the value of the imaginary numbered part PI in the element ET become 0). More specifically, the value of the real numbered part PR of the element R(1,1) in the first column and the first row of the matrix R is transposed to a value of the real numbered part of the element R(1,2). A rotation angle dxR(1,1) may be calculated by using the coordinate rotation digital computer. Namely, the values of the real numbered parts PR of the elements R(1,1) and R(1,2) are input to the coordinate rotation digital computer to obtain the rotation angle dxR(1,1).

At this time, regardless of the first block PE1 or the second block PE2, all the elements ET in the first row of the matrix R are rotated, based on the rotation angle dxR(1,1), from the real numbered parts PR thereof toward the real numbered parts PR of the elements ET above (i.e., the second row) and from the imaginary numbered parts PI thereof toward the imaginary numbered parts PI of the elements ET above (i.e., the second row). Also, to keep the consistency of the matrix, all the elements ET in the fifth column of the matrix Q are rotated, based on the rotation angle dxR(1,1), from the real numbered parts PR thereof toward the real numbered parts PR of the elements ET in the left (i.e., the fourth column) and from the imaginary numbered parts PI thereof toward the imaginary numbered parts PI of the elements ET in the left (i.e., the fourth column).

Then, the value of the real numbered part PR of the element R(1,2) in the first column and the second row in the matrix R is transposed to a value of the real numbered part of an element R(1,3) through the matrix rotation, and a rotation angle thereof is dxR(1,2). At this time, regardless of the first block PE1 or the second block PE2, all the elements ET in the second row of the matrix R are rotated, based on the rotation angle dxR(1,2), from the real numbered parts PR thereof toward the real numbered parts PR of the elements ET above (i.e., the third row) and from the imaginary numbered parts PI thereof toward the imaginary numbered parts PI of the elements ET above (i.e., the third row). Also, to keep the consistency of the matrix, all the elements ET in the fourth column of the matrix Q are rotated, based on the rotation angle dxR(1,2), from the real numbered parts PR thereof toward the real numbered parts PR of the elements ET in the left (i.e., the third column) and from the imaginary numbered parts PI thereof toward the imaginary numbered parts PI of the elements ET in the left (i.e., the third column).

Remaining of the elements ET in the first column of the matrix R may be processed based on the foregoing. All the elements ET in the matrix R are rotated, based on the corresponding rotation angles, from the real numbered parts PR thereof toward the real numbered parts PR of the elements ET above, and from the imaginary numbered parts PI thereof toward the imaginary numbered parts PI of the elements ET above. Also, all the elements ET in the matrix Q are rotated, based on the corresponding rotation angles, from the real numbered parts PR thereof toward the real numbered parts PR of the elements ET in the left, and from the imaginary numbered parts PI thereof toward the imaginary numbered parts PI of the elements in the left. In addition, the processing direction of the elements ET in the matrix R is also from bottom to top (according to the direction of the figure, for example), and the processing direction of the elements ET in the matrix Q is also from right to left (according to the direction of the figure, for example). Also, the rotation angle of the elements in the matrix R is positive (i.e., positive angle rotation), and the rotation angle of the elements ET in the matrix Q is positive (i.e., positive angle rotation). When the values of the real numbered parts PR and the imaginary numbered parts of two adjacent elements ET are 0, a state that the values thereof are 0 does not change after the matrix rotation.

In FIG. 2D, the elements ET in the fifth row in the second block PE2 of the matrix R are converted into real numbered elements (i.e., a value of the imaginary numbered part PI in the element ET becomes 0) by using a matrix rotation. Specifically, an element R(5,5) at the fifth column and the fifth row in second block PE2 of the matrix R may transpose a value of the imaginary numbered part PI thereof to the real numbered part PR thereof through the matrix rotation, and a rotation angle thereof is dR(5,5). At this time, regardless of the first block PE1 or the second block PE2, all the elements ET in the fifth column of the matrix R may rotate, based on the rotation angle dR(5,5), from the imaginary numbered parts PI thereof toward the real numbered parts PR thereof. To keep the consistency of the matrix, all the elements ET in the first row of the matrix P may rotate from the imaginary numbered parts PI thereof toward the real numbered parts PR thereof according to the rotation angle dR(5,5).

Then, an element R(4,5) at the fourth column and the fifth row in the second block PE2 may transpose a value of the imaginary numbered part PI thereof to the real numbered part thereof through the matrix rotation, and a rotation angle thereof is dR(4,5). At this time, regardless of the first block PE1 or the second block PE2, all the elements ET in the fourth column of the matrix R may rotate from the imaginary numbered part PI to the real numbered part PR according to the rotation angle dR(4,5). To keep the consistency of the matrix, all the elements ET in the second row of the matrix P may rotate from the imaginary numbered parts PI thereof to the real numbered parts PR thereof according to the rotation angle dR(4,5).

Other elements ET in the fifth row in the second block PE2 may be processed based on the foregoing, and the elements ET in the matrices R and P are all rotated from the imaginary numbered parts PI thereof toward the real numbered parts PR according to the corresponding rotation angles. Moreover, the processing direction of the elements ET in the matrix R is from right to left (according to the direction of the figure, for example), and the processing direction of the elements ET in the matrix P is from bottom to top (according to the direction of the figure, for example). Also, the rotation angle of the elements in the matrix R is positive (i.e., positive angle rotation), and the rotation angle of the elements ET in the matrix P is negative (i.e., negative angle rotation). For the element ET whose value in the real numbered part PR is 0 and whose value in the imaginary numbered part is 0, the value thereof does not change after the matrix rotation.

In FIG. 2E, all the elements ET except for an element R(2,5) at the fifth row of the second block PE2 of the matrix R are made ineffective (i.e., the values of the real numbered part PR and the imaginary numbered part PI in the element ET become 0). More specifically, the value of the real numbered part PR of the element R(5,5) at the fifth column and the fifth row in the second block PE2 is transposed to a value of the real numbered part of the element R(4,5) through the matrix rotation, and a rotation angle thereof is dxR(5,5). At this time, regardless of the first block PE1 or the second block PE2, all the elements ET in the first row of the matrix R are rotated, based on the rotation angle dxR(5,5), from the real numbered parts PR thereof toward the real numbered parts PR of the elements ET in the left (i.e., the fourth column) and from the imaginary numbered parts PI thereof toward the imaginary numbered parts PI of the elements ET in the left (i.e., the fourth column). Also, to keep the consistency of the matrix, all the elements ET in the first row of the matrix P are rotated, based on the rotation angle dxR(5,5), from the real numbered parts PR thereof toward the real numbered parts PR of the elements ET above (i.e., the second row) and from the imaginary numbered parts PI thereof toward the real numbered parts PI of the elements ET in above (i.e., the second row).

Then, the value of the real numbered part PR of the element R(4,5) at the fourth column and the fifth row in the second block PE2 is transposed to a value of the real numbered part of an element R(3,5) through the matrix rotation, and a rotation angle thereof is dxR(4,5). At this time, regardless of the first block PE1 or the second block PE2, all the elements ET in the second row of the matrix R are rotated, based on the rotation angle dxR(4,5), from the real numbered parts PR thereof toward the real numbered parts PR of the elements ET in the left (i.e., the third column) and from the imaginary numbered parts PI thereof toward the imaginary numbered parts PI of the elements ET in the left (i.e., the third column). Also, to keep the consistency of the matrix, all the elements ET in the second row of the matrix P are rotated, based on the rotation angle dxR(4,5), from the real numbered parts PR thereof toward the real numbered parts PR of the elements ET above (i.e., the third row) and from the imaginary numbered parts PI thereof toward the real numbered parts PI of the elements ET above (i.e., the third row).

Remaining of the elements ET in the fifth row in the second block PE2 may be processed based on the foregoing. All the elements ET in the matrix R are rotated, based on the corresponding rotation angles, from the real numbered parts PR thereof toward the real numbered parts PR of the elements ET in the left, and from the imaginary numbered parts PI thereof toward the imaginary numbered parts PI of the elements ET in the left. Also, all the elements ET in the matrix P are rotated, based on the corresponding rotation angles, from the real numbered parts PR thereof toward the real numbered parts PR of the elements ET above, and from the imaginary numbered parts PI thereof toward the imaginary numbered parts PI of the elements above. In addition, the processing direction of the elements ET in the matrix R is also from right to left (according to the direction of the figure, for example), and the processing direction of the elements in the matrix P is also from bottom to top (according to the direction of the figure, for example). When the values of the real numbered parts PR and the imaginary numbered parts of two adjacent elements ET are 0, a state that the values thereof are 0 does not change after the matrix rotation.

Processing of elements illustrated in FIGS. 2F to 2Q are similar to processing of elements illustrated in FIGS. 2B to 2E, and are thus not repeated below. Accordingly, since the matrix sizes of the matrices Q, R, and P are the same, a memory space and a computation complexity required for decomposing the channel matrix may be reduced.

Based on the above, the channel decomposition unit 150 performs the first matrix rotation to first complex numbered elements ET in the first block PE1 to make the first complex numbered elements ET in the diagonal real numbered elements and make values of other first complex numbered elements zero, and rotates the first unit matrix (i.e., the matrix Q) by column based on a rotation angle of the first matrix rotation performed to the first complex numbered elements. In addition, after performing the first matrix rotation to second complex numbered elements ET in the second block PE2, the second complex numbered elements ET closed the diagonal become real numbered elements while values of other second complex numbered elements ET are 0. Also, the second unit matrix (i.e., the matrix P) is rotated by row based on a rotation angle of the first matrix rotation performed to the second complex numbered elements ET.

To be more specific, the channel decomposition unit 150 makes the imaginary numbered part PI (i.e., a first imaginary numbered part) of each of the first complex numbered elements ET zero by transposing the imaginary numbered part PI of each of the first complex numbered elements ET to the real numbered part PR (i.e., a first real numbered part) of each of the first complex numbered elements ET through the first matrix rotation, and then makes the real numbered parts PR of each of the first complex numbered elements ET zero by transposing the real numbered part PR of each of the first complex numbered elements ET to the real numbered part PR of the adjacent first complex numbered element ET through the first matrix rotation. In addition, the channel decomposition unit 150 makes the imaginary numbered part PI (i.e., a second imaginary numbered part) of each of the second complex numbered elements ET zero by transposing the imaginary numbered part PI of each of the second complex numbered elements ET to the real numbered part PR (i.e., a second real numbered part) of each of the second complex numbered elements ET through the matrix rotation, and then makes the real numbered part PR of each of the second complex numbered elements ET zero by transposing the real numbered part PR of each of the second complex numbered elements ET to the real numbered part PR of the adjacent second complex numbered element ET through the first matrix rotation.

In this embodiment, when the imaginary numbered part PI of each of the first complex elements ET is transposed to the real numbered part PR of each of the first complex elements ET through the first matrix rotation, transposing of the first matrix rotation of the first and second complex numbered elements ET in the same row is also performed at the same time. When the real numbered part PR of each of the first complex elements ET is transposed to the real numbered part PR of the adjacent first complex element ET through the matrix rotation, transposing of the first matrix rotation of the first and second complex numbered elements ET in the same row is also performed at the same time. When the imaginary numbered part PI of each of the second complex elements ET is transposed to the real numbered part PR of each of the second complex elements ET through the first matrix rotation, transposing of the first matrix rotation of the first and second complex numbered elements ET in the same column is also performed at the same time. When the real numbered part PR of each of the second complex elements ET is transposed to the real numbered part PR of the adjacent second complex element ET through the first matrix rotation, transposing of the first matrix rotation of the first and second complex numbered elements ET in the same row is also performed at the same time.

Figure 3:
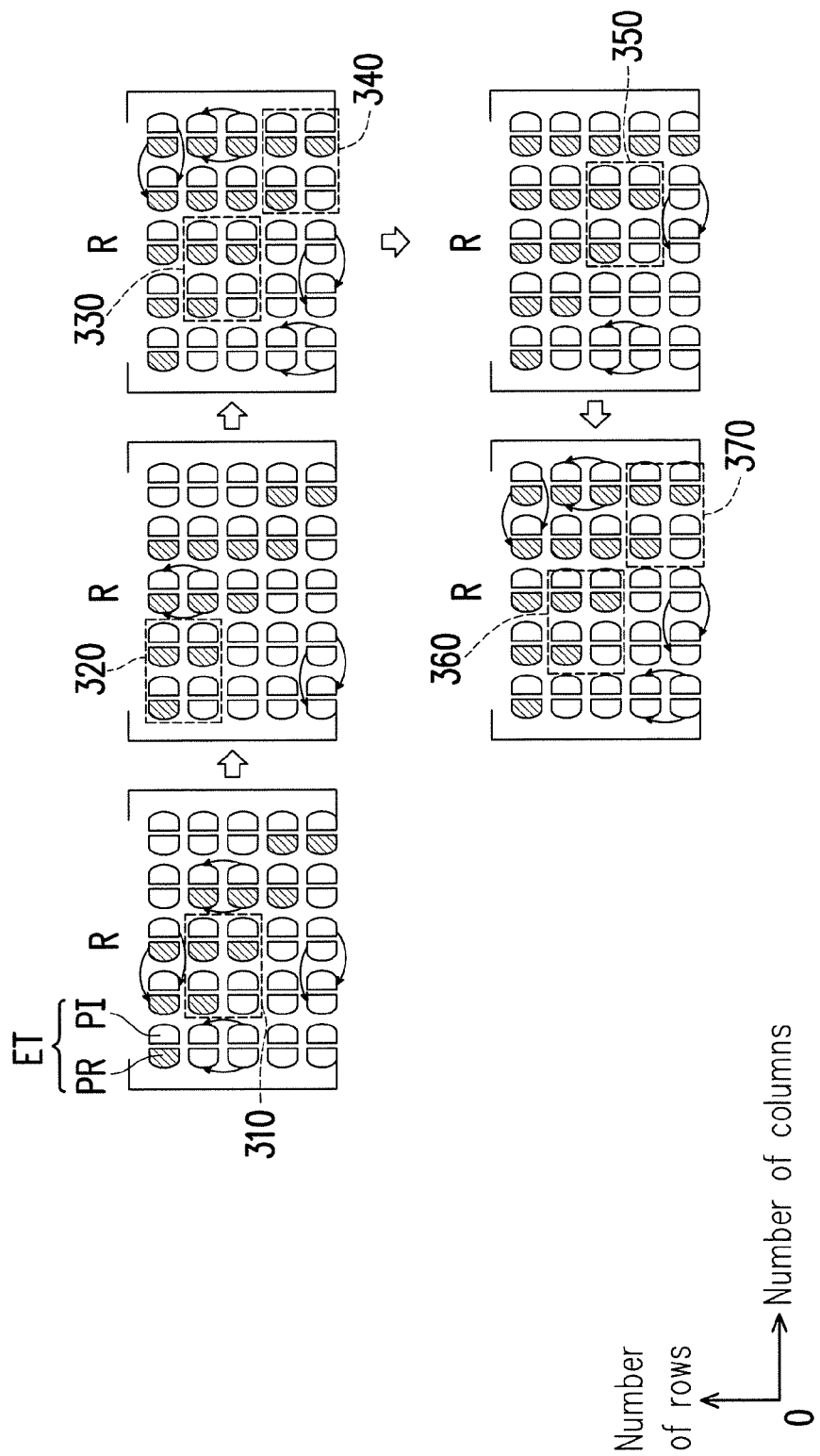
FIG. 3 is a schematic view illustrating equalization of a diagonal of a channel matrix according to an embodiment of the invention.

FIG. 3 is a schematic view illustrating equalization of a diagonal of a channel matrix according to an embodiment of the invention. Referring to FIGS. 2A to 2Q and FIG. 3, after obtaining the matrix R in FIG. 2Q, the elements in the diagonal may be equalized to homogenize an energy distribution at a transmitting end. In other words, a transmission power of an antenna is equalized. In a method of equalization, the number in the diagonal is firstly determined to determine how the real numbered elements in the diagonal are processed. The matrix R in FIG. 2Q is a 5×5 matrix, namely the number of the real numbered elements in the diagonal is 5 (not equal to a power of 2), so the matrix R is approximately divided into two computation parts. The number of the elements ET in the diagonal in one of the computation part is equal to a power of 2. Here, the element R(1,5) is divided as one computation part, elements R(2,4), R(3,3), R(4,2), and R(5,1) are the other computation part, and the element R(1,5) is processed in advance.

Then, whether a planar rotation may be performed to the elements R(1,5) and R(2,4) is determined. Namely, whether a diagonal geometric mean of the elements R(1,5), R(2,4), R(3,3), R(4,2) and R(5,1) is between real number values of the elements R(1,5) and R(2,4), or, in other words, whether the diagonal geometric mean of the elements R(1,5), R(2,4), R(3,3), R(4,2) and R(5,1) is between the real number values of the elements R(1,5) and R(2,4) is determined.

When the diagonal geometric mean is between the real number values of the elements R(1,5) and R(2,4), the planar rotation is performed to the elements R(1,5) and R(2,4), such that the real number value of the element R(1,5) is equal to the diagonal geometric mean. When the diagonal geometric mean is not between the real number values of the elements R(1,5) and R(2,4), an element permutation is performed to make the elements R(3,3), R(4,2), and R(5,1) sequentially adjacent to the element R(1,5), and whether the diagonal geometric mean is between the real number values of the element R(1,5) and the adjacent element ET is sequentially compared. When the element permutation is performed, a 2×2 sub-matrix (e.g., 310) is chosen, so as to permute the adjacent element ET in the diagonal (e.g., elements R(2,4) and R(3,3)). A formula of element permutation is provided as follows:

$$\begin{bmatrix} -\sin\theta_P & \cos\theta_P \\ \cos\theta_P & \sin\theta_P \end{bmatrix} \begin{bmatrix} a & b \\ 0 & d \end{bmatrix} \begin{bmatrix} \sin\theta_P & \cos\theta_P \\ \cos\theta_P & -\sin\theta_P \end{bmatrix} = \begin{bmatrix} d & b \\ 0 & a \end{bmatrix}$$

Here, $$\theta_P = \tan^{-1}\left(\frac{-b}{a+d}\right).$$

Also, when the elements ET in the sub-matrix 310 rotate, the elements ET in the two columns and rows at a location of the sub-matrix 310 are rotated based on $\theta_P$, and the elements ET in the corresponding column of the matrix Q and the corresponding row in the matrix P are also rotated based on $\theta_P$.

When the planar rotation is performed, a 2×2 sub-matrix (e.g., 320) is chosen, and a singular value decomposition is also performed to the chosen sub-matrix (e.g., 320). Then, the planar rotation is performed to the decomposed sub-matrix (e.g., 320), such that real number values of the upper-left elements ET are rotated to be equal to the diagonal geometric mean. A formula for the singular value decomposition is provided as follows:

$$\begin{bmatrix} \cos(\theta_1) & \sin(\theta_1) \\ -\sin(\theta_1) & \cos(\theta_1) \end{bmatrix} \begin{bmatrix} a & b \\ 0 & d \end{bmatrix} \begin{bmatrix} \cos(\theta_2) & -\sin(\theta_2) \\ \sin(\theta_2) & \cos(\theta_2) \end{bmatrix} = \begin{bmatrix} \sigma_k & 0 \\ 0 & \sigma_{k+1} \end{bmatrix}$$

Here, σ k and σ k+1 are the real number values of two adjacent elements ET in the diagonal, $$\theta_a = (\theta1 + \theta2) = \tan^{-1}\left(\frac{b}{a-d}\right),$$

and $$\theta_b = (\theta1 - \theta2) = \tan^{-1}\left(\frac{-b}{a+d}\right).$$

A formula of the planar rotation is provided as follows:

$$\begin{bmatrix} \sigma_k & 0 \\ 0 & \sigma_{k+1} \end{bmatrix} \begin{bmatrix} \cos(\theta_6) & -\sin(\theta_6) \\ \sin(\theta_6) & \cos(\theta_6) \end{bmatrix} = \begin{bmatrix} \alpha & * \\ \beta & * \end{bmatrix}$$

$$\begin{bmatrix} \cos(\theta_5) & \sin(\theta_5) \\ -\sin(\theta_5) & \cos(\theta_5) \end{bmatrix} \begin{bmatrix} \alpha & * \\ \beta & * \end{bmatrix} = \begin{bmatrix} \delta & * \\ 0 & * \end{bmatrix}$$

wherein * is an arbitrary value, δ is the diagonal geometric mean, $$\theta 6 = \tan^{-1}\sqrt{\frac{\sigma_k^2 - \delta^2}{\delta^2 - \sigma_{k+1}^2}},$$

and $$\theta 5 = \tan^{-1}\left(\frac{\beta}{\alpha}\right).$$

Combining the singular value decomposition and the planar rotation, a formula for converting the sub-matrix 320 is provided as follows:

$$\begin{bmatrix} \cos(\theta_1 + \theta_5) & \sin(\theta_1 + \theta_5) \\ -\sin(\theta_1 + \theta_5) & \cos(\theta_1 + \theta_5) \end{bmatrix} \begin{bmatrix} a & b \\ 0 & d \end{bmatrix} \begin{bmatrix} \cos(\theta_2 + \theta_6) & -\sin(\theta_2 + \theta_6) \\ \sin(\theta_2 + \theta_6) & \cos(\theta_2 + \theta_6) \end{bmatrix}$$

Here, a left-rotating angle dlp=($\theta_1+\theta_5$) serves to rotate the elements ET in two corresponding columns in the matrix Q, and also serves to rotate the elements ET in the two rows at the location of the sub-matrix 320. A right-rotating angle drp=($\theta_2+\theta_6$) serves to rotate the elements ET in two corresponding rows in the matrix P, and also serves to rotate the elements ET in the two columns at the location of the sub-matrix 320.

After the element R(1,5) is processed, the remaining elements (e.g., R(2,4), R(3,3), R(4,2), and R(5,1)) are processed at the same time. Similarly, the number of the elements is a power of 2, and the elements are thus able to be divided into a plurality of 2×2 sub-matrices (e.g., 330 and 340), so as to perform the singular value decomposition and a geometric mean decomposition to the sub-matrices at the same time. Details of the singular value decomposition may be referred to the above, and a formula of the geometric mean decomposition is provided as follows:

$$\begin{bmatrix} \cos(\theta_3) & \sin(\theta_3) \\ -\sin(\theta_3) & \cos(\theta_3) \end{bmatrix} \begin{bmatrix} \sigma_k & 0 \\ 0 & \sigma_{k+1} \end{bmatrix} \begin{bmatrix} \cos(\theta_4) & -\sin(\theta_4) \\ \sin(\theta_4) & \cos(\theta_4) \end{bmatrix} = \begin{bmatrix} \delta & * \\ 0 & \delta \end{bmatrix}$$

Here, * is an arbitrary value, δ is a diagonal geometric mean, $$\theta_4 = \tan^{-1}\sqrt{\frac{\sigma_k}{\sigma_{k+1}}},$$

and $$\theta_3 = \frac{\pi}{2} - \theta_4.$$

Combining the singular value decomposition and the geometric mean decomposition, a formula of converting the sub-matrix 320 is provided as follows:

$$\begin{bmatrix} \cos(\theta_1 + \theta_3) & \sin(\theta_1 + \theta_3) \\ -\sin(\theta_1 + \theta_3) & \cos(\theta_1 + \theta_3) \end{bmatrix} \begin{bmatrix} a & b \\ 0 & d \end{bmatrix} \begin{bmatrix} \cos(\theta_2 + \theta_4) & -\sin(\theta_2 + \theta_4) \\ \sin(\theta_2 + \theta_4) & \cos(\theta_2 + \theta_4) \end{bmatrix}$$

In this embodiment, the left-rotating angle drg=(θ1+θ3) serves to rotate the elements ET in two corresponding columns in the matrix Q, and also serves to rotate the elements ET in the two rows at respective locations of the sub-matrices 330 and 340. The right-rotating angle drg=(θ2+θ4) serves to rotate the elements ET in two corresponding rows in the matrix P, and also serves to rotate the elements ET in the two columns at the respective locations of the sub-matrices 320 and 340.

After the singular value decomposition and the geometric mean decomposition, the elements of the sub-matrices 320 and 340 in the diagonal are permuted through element permutation (i.e., performing element permutation to the sub-matrix 350). After the permutation, another singular value decomposition and geometric mean decomposition are performed again (i.e., performing the singular value decomposition and geometric mean decomposition to the sub-matrices 360 and 370), so as to naturally equalize the elements R(2,4), R(3,3), R(4,2), and R(5,1) in the diagonal through multiple times of singular value decomposition and geometric mean decomposition. Since the geometric mean of the elements ET in the diagonal is the same, the mean remains the same after different processes.

In an embodiment of the invention, the rotation angle may be overly large to influence the process of the matrix. Thus, when the rotation angle is overtly large, the rotation angle is subtracted by 90 degrees and then brought into a corresponding trigonometric function, such as sin(−90)=−cos(θ) or cos(θ−90)=sin(θ). In addition, the time of performing the matrix rotation to the matrices Q and R is different from the time of performing the matrix rotation to the matrices R and S. Thus, the same hardware (e.g., the coordinate rotation digital computer) may perform the matrix rotations, and a hardware cost and power consumption do not increase significantly.

In this embodiment, after the elements ET in the diagonal of the matrix R are equalized, the matrix P synchronously rotated may be provided as the channel state information V1, and the matrix Q synchronously rotated may be provided as the decoding reference matrix T. Besides, in the above embodiment, it is assumed that the number of the elements ET in the diagonal is not equal to a power of 2. When the number of the elements ET is equal to a power of 2, the process is similar to the process to the elements R(2,4), R(3,3), R(4,2), and R(5,1) and may be referred to the above embodiment. Thus, the contents in this respect will not be repeated below. In other words, the embodiments of the invention are applicable to an arbitrary M×M matrix, wherein M is an arbitrary integer.

In this embodiment, the diagonal geometric mean of the elements R(1,5), R(2,4), R(3,3), R(4,2), and R(5,1) is an N-th root of a multiplication product of the real number values of the elements R(1,5), R(2,4), R(3,3), R(4,2), and R(5,1). In addition, the diagonal geometric mean may be represented as $$\sqrt[N]{\delta_X}.$$

Here, N is the number of the elements ET in the diagonal (5 in this embodiment, for example), and $\delta_X$ represents the multiplication product of the elements ET in the diagonal. In this embodiment, $$\sqrt[N]{\delta_X}$$

may be represented as $$\delta_X^{\frac{1}{N}} = e^{\frac{1}{N}\ln\delta_X}.$$

Namely, the multiplication product of the real numbered elements in the diagonal may be represented with an exponential function and a natural logarithm. Then, ln δX may be further represented as $$2\tanh^{-1}\left|\frac{\delta_X - 1}{\delta_X + 1}\right|.$$

Namely, $$\sqrt[N]{\delta}$$

may be further represented as $$\sinh\left(\frac{1}{N}2\tanh^{-1}\left|\frac{\delta_X - 1}{\delta_X\delta + 1}\right|\right) + \cosh\left(\frac{1}{N}2\tanh^{-1}\left|\frac{\delta_X - 1}{\delta_X + 1}\right|\right).$$

In this way, the diagonal geometric mean $$\sqrt[N]{\delta_X}$$

may be calculated by using the coordinate rotation digital computer.

In some embodiments, the coordinate rotation digital computer calculates an outcome by using a recursive operation, and an input value may be overly large or small, resulting in an operational error. Thus, when the input value is overly large, the value is reduced by shifting, and then a constant is supplemented for correction. For example, after a rightward shift for X+1 bits, ln($2^{X+1}$) is supplemented. When the input value is overly small, the value is enlarged by shifting, and then a constant is supplemented for correction. For example, after a leftward shift for X+1 bits, $-\ln(2^{X+1})$ is supplemented. Besides, when a numerical part of the exponential is a negative number or is too small, an exponential with a large positive value and a large negative value may be added for approximation. However, such process may compromise an accuracy of operation. Thus, when the numerical part of the exponential is negative or too small, an arbitrary constant y may be added and then a constant $e^{-y}$ may be supplemented by using a canonical signed digit (CSD).

Besides, since the decomposition of the channel matrix H and restoring of a matrix PX to the unit matrix are made through the matrix rotation, a hardware (e.g., the coordinate rotation digital computer) of this part may be shared. Thus, the hardware cost and power consumption do not increase significantly.

Figure 4:
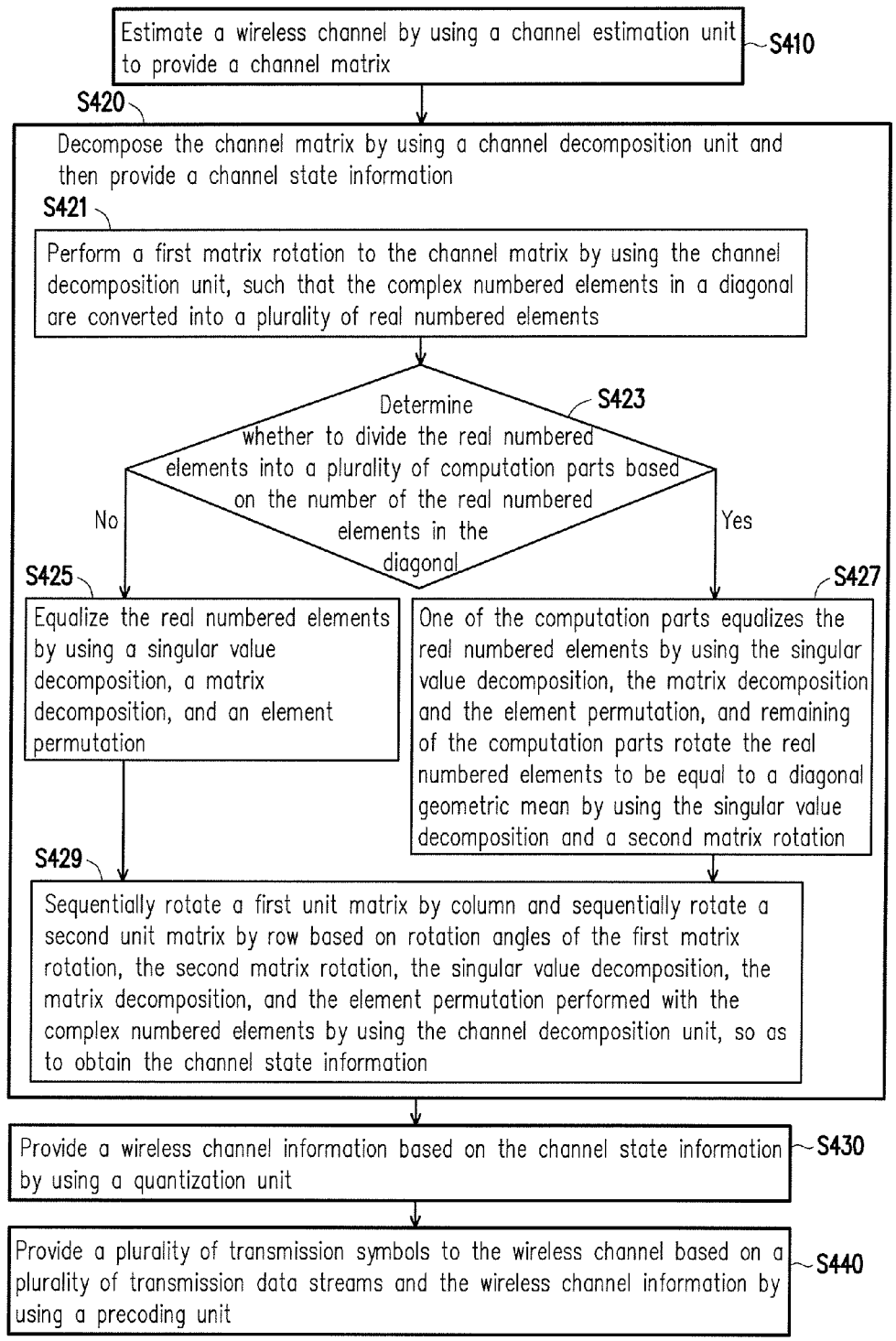
FIG. 4 is a flowchart illustrating a channel decomposition method of a multiple input multiple output wireless communication system according to an embodiment of the invention.

FIG. 4 is a flowchart illustrating a channel decomposition method of a multiple input multiple output wireless communication system according to an embodiment of the invention. Referring to FIG. 4, in this embodiment, the channel decomposition method at least includes steps as follows. A channel matrix having a plurality of complex numbered elements is provided by using a channel estimation unit to estimate a wireless channel (Step S410), and the channel matrix is decomposed by using a channel decomposition unit to provide a channel state information (Step S420). Then, a wireless channel information is provided based on the channel state information by using a quantization unit (Step S430), and a plurality of transmission symbols are provided to the wireless channel based on a plurality of transmission data streams and the wireless channel information by using a precoding unit (Step S440).

In addition, Step S420 of this embodiment includes: performing a first matrix rotation to the channel matrix by using the channel decomposition unit, such that the complex numbered elements in a diagonal are converted into a plurality of real numbered elements (Step S421); determining whether to divide the real numbered elements into a plurality of computation parts based on the number of the real number elements in the diagonal (Step S423); when the real numbered elements are not divided into the computation parts, i.e., when a result of determination at Step S423 is "No", the channel decomposition unit equalizing the real numbered elements by using a singular value decomposition, a matrix decomposition, and an element permutation (Step S425); when the real numbered elements are divided into the computation parts, i.e., the result of determination at Step S423 is "Yes", one of the computation parts equalizing the real numbered elements by using the singular value decomposition, the matrix decomposition and the element permutation, and remaining of the computation parts rotating the real numbered elements to become equal to a diagonal geometric mean by using the singular value decomposition and a second matrix rotation (Step S427); after Steps S425 and S427, sequentially rotating a first unit matrix by column and sequentially rotating a second unit matrix by row based on a plurality of rotation angles of the first matrix rotation, the second matrix rotation, the singular value decomposition, the matrix decomposition, and the element permutation performed with the complex numbered elements by using the channel decomposition unit, so as to obtain the channel state information (Step S429). Here, a sequence of Steps S410, S420, S421, S423, S425, S427, S429, S430, and S440 is only described for an illustrative purpose, and the embodiments of the invention are not limited thereto. Also, details of Steps S410, S420, S421, S423, S425, S427, S429, S430, and S440 may be referred to the embodiments shown in FIG. 1, FIGS. 2A to 2Q and FIG. 3, and are thus not repeated below.

Based on the above, in the multiple input multiple output wireless communication system and the channel decomposition method thereof according to the embodiments of the invention, the channel matrix is directly decomposed into three matrices by using the first matrix rotation. In addition, the matrix sizes of the three matrices are the same as that of the channel matrix. In this way, the memory space and the computation complexity required for decomposing the channel matrix may be reduced. In addition, the values of the elements in the diagonal may be equalized by using the second matrix rotation and the matrix decomposition, so as to equalize the power value of the matrix. In addition, the hardware for performing the second matrix rotation and/or matrix decomposition may be shared (e.g., by using the coordinate rotation digital computer). Thus, the hardware cost may be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multiple input multiple output wireless communication system, comprising:
   a precoding unit, receiving a plurality of transmission data streams and a quantized wireless channel information to provide a plurality of transmission symbols to a wireless channel;
   a channel estimation unit, estimating the wireless channel to provide a channel matrix having a plurality of complex numbered elements;
   a channel decomposition unit, decomposing the channel matrix and then providing a channel state information, wherein the channel decomposition unit performs a first matrix rotation to the channel matrix to convert the complex numbered elements in a diagonal into a plurality of real numbered elements, and determines whether the real numbered elements are divided into a plurality of computation parts based on the number of the real numbered elements in the diagonal, wherein when the real numbered elements are not divided into the computation parts, the channel decomposition unit equalizes the real numbered elements by using a singular value decomposition, a matrix decomposition, and an element permutation, when the real numbered elements are divided into a plurality of computation parts, one of the computation parts equalizes the real numbered elements by using the singular value decomposition, the matrix decomposition, and the element permutation, and remaining of the computation parts rotate the real numbered elements to be equal to a diagonal geometric mean through the singular value decomposition and a second matrix rotation, and the channel decomposition unit sequentially rotates a first unit matrix by column and sequentially rotates a second unit matrix by row based on a plurality of rotation angles of the first matrix rotation, the second matrix rotation, the singular value decomposition, the matrix decomposition, and the element permutation performed with the complex numbered elements to obtain the channel state information; and
   a quantization unit, providing the wireless channel information based on the channel state information.

2. The multiple input multiple output wireless communication system as claimed in claim 1, wherein when the number of the real numbered elements in the diagonal is a power of 2, the real numbered elements in the diagonal are divided into a plurality of sub-matrices to equalize the real numbered elements by using the singular value decomposition, the matrix decomposition, and the element permutation, and when the number of the real numbered elements is not a power of 2, the real numbered elements in the diagonal are divided into a first computation part and a second computation part, wherein the real numbered elements in the first computation part are rotated to be equal to the diagonal geometric mean by using the singular value decomposition and the second matrix rotation, and the second computation part are divided into the sub-matrices to equalize the real numbered elements by using the singular value decomposition, the matrix decomposition, and the element permutation, wherein the number of the real numbered elements comprised in the second computation part is a power of 2.

3. The multiple input multiple output wireless communication system as claimed in claim 2, wherein in the first computation part, when the diagonal geometric mean is between real number values of each of the real numbered elements in the diagonal and the adjacent real numbered element in the diagonal, remaining of the real numbered elements are made to be sequentially adjacent to the each of the real numbered elements through the element permutation, and when the diagonal geometric mean is between the real number values of each of the real numbered elements in the diagonal and the adjacent real numbered element in the diagonal, each of the real numbered elements and the adjacent real numbered element are rotated by using the singular value decomposition and the second matrix rotation, such that a value of each of the real numbered elements is equal to the diagonal geometric mean.

4. The multiple input multiple output wireless communication system as claimed in claim 1, wherein the diagonal geometric mean is an N-th root of multiplication of the real numbered elements in the diagonal, and N is the number of the real numbered elements.

5. The multiple input multiple output wireless communication system as claimed in claim 4, wherein the channel decomposition unit represents a product of multiplication of the real numbered elements with an exponential function and a natural logarithm, so as to calculate the diagonal geometric mean by using a coordinate rotation digital computer.

6. The multiple input multiple output wireless communication system as claimed in claim 1, wherein the first matrix rotation is a Givens rotation, the second matrix rotation is a planar rotation, and the matrix decomposition is a geometric mean decomposition (GMD).

7. A channel decomposition method of a multiple input multiple output wireless communication system, the method comprising:
  estimating a wireless channel by using a channel estimation unit to provide a channel matrix;
  decomposing the channel matrix by using a channel decomposition unit and then providing a channel state information having a plurality of complex numbered elements, comprising:
    performing a first matrix rotation to the channel matrix by using the channel decomposition unit, such that the complex numbered elements in a diagonal are converted into a plurality of real numbered elements;
    determining whether to divide the real numbered elements into a plurality of computation parts based on the number of the real numbered elements in the diagonal by using the channel decomposition unit,
    wherein when the real numbered elements are not divided into the computation parts, the channel decomposition unit equalizes the real numbered elements by using a singular value decomposition, a matrix decomposition, and an element permutation, and
    when the real numbered elements are divided into the computation parts, one of the computation parts equalizes the real numbered elements by using the singular value decomposition, the matrix decomposition and the element permutation, and remaining of the computation parts rotate the real numbered elements to be equal to a diagonal geometric mean by using the singular value decomposition and a second matrix rotation; and
    sequentially rotating a first unit matrix by column and sequentially rotating a second unit matrix by row based on a plurality of rotation angles of the first matrix rotation, the second matrix rotation, the singular value decomposition, the matrix decomposition, and the element permutation performed with the complex numbered elements by using the channel decomposition unit, so as to obtain the channel state information;
  providing a wireless channel information based on the channel state information by using a quantization unit; and
  providing a plurality of transmission symbols to the wireless channel based on a plurality of transmission data streams and the wireless channel information by using a precoding unit.

8. The channel decomposition method of the multiple input multiple output wireless communication system as claimed in claim 7, further comprising:
  when the number of the real numbered elements in the diagonal is a power of 2, dividing the real numbered elements in the diagonal into a plurality of sub-matrices to equalize the real numbered elements by using the singular value decomposition, the matrix decomposition, and the element permutation respectively; and
  when the number of the real numbered elements is not a power of 2, the real numbered elements in the diagonal are divided into a first computation part and a second computation part, the real numbered elements in the first computation part are rotated to be equal to the diagonal geometric mean by using the singular value decomposition and the second matrix rotation, and the second computation part is divided into the sub-matrices to equalize the real numbered elements by using a singular value decomposition, the matrix decomposition, and an element permutation, wherein the number of the real numbered elements comprised in the second computation part is a power of 2.

9. The channel decomposition method of the multiple input multiple output wireless communication system as claimed in claim 8, further comprising:
  when the diagonal geometric mean is not between real number values of each of the real numbered elements in the diagonal in the first computation part and the adjacent real numbered element in the diagonal, making remaining of the real numbered elements sequentially adjacent to the each of the real numbered elements by using the element permutation; and
  when the diagonal geometric mean is between the real number values of each of the real numbered elements in the diagonal and the adjacent real numbered element in the diagonal, rotating each of the real numbered elements and the adjacent real numbered element by using the singular value decomposition and the second matrix rotation, such that a value of each of the real numbered elements is equal to the diagonal geometric mean.

10. The channel decomposition method of the multiple input multiple output wireless communication system as claimed in claim 7, wherein the diagonal geometric mean is an N-th root of multiplication of the real numbered elements in the diagonal, and N is the number of the real elements.

11. The channel decomposition method of the multiple input multiple output wireless communication system as claimed in claim 10, wherein the channel decomposition unit represents a product of multiplication of the real numbered elements with an exponential function and a natural logarithm, so as to calculate the diagonal geometric mean by using a coordinate rotation digital computer.

12. The channel decomposition method of the multiple input multiple output wireless communication system as claimed in claim 7, wherein the first matrix rotation is a Givens rotation, the second matrix rotation is a planar rotation, and the matrix decomposition is a geometric mean decomposition (GMD).

* * * * *